United States Patent
Lameres et al.

(10) Patent No.: US 12,050,688 B1
(45) Date of Patent: Jul. 30, 2024

(54) MALWARE-RESISTANT OBFUSCATED COMPUTER HARDWARE FOR RECONFIGURABLE HARDWARE DEVICES AND METHODS THEREOF

(71) Applicants: MONTANA STATE UNIVERSITY, Bozeman, MT (US); RESILIENT COMPUTING, LLC, Bozeman, MT (US)

(72) Inventors: Brock Jerome Lameres, Bozeman, MT (US); Christopher Michel Major, Belgrade, MT (US); Clemente I. Izurieta, Bozeman, MT (US)

(73) Assignees: MONTANA STATE UNIVERSITY, Bozeman, MT (US); RESILIENT COMPUTING, LLC, Bozeman, MT (US)

( * ) Notice: Subject to any disclaimer, the term of this patent is extended or adjusted under 35 U.S.C. 154(b) by 0 days.

(21) Appl. No.: 18/443,133

(22) Filed: Feb. 15, 2024

(51) Int. Cl.
  *G06F 21/00* (2013.01)
  *G06F 21/56* (2013.01)
(52) U.S. Cl.
  CPC ...... *G06F 21/566* (2013.01); *G06F 2221/034* (2013.01)
(58) Field of Classification Search
  CPC .. G06F 21/566; G06F 2221/034; G06F 21/56; G06F 21/563; H04L 63/1441; H04L 63/145; H04L 63/1466
  See application file for complete search history.

(56) References Cited

U.S. PATENT DOCUMENTS

| | | | |
|---|---|---|---|
| 7,237,148 B2 | 6/2007 | Czajkowski et al. | |
| 8,738,860 B1 | 5/2014 | Griffin et al. | |
| 2004/0199813 A1 | 10/2004 | Hillman et al. | |
| 2005/0005203 A1 | 1/2005 | Czajkowski | |
| 2006/0129897 A1 | 6/2006 | Gomyo | |
| 2014/0337918 A1* | 11/2014 | Siddiqi | H04L 63/083 726/25 |

(Continued)

OTHER PUBLICATIONS

Gahl, T. J., "Triplicated Instruction Set Randomization in Parallel Heterogenous Soft-Core Processors," A Thesis submitted in partial fulfillment of the requirements for the degree of Master of Science in Electrical Engineering, Montana State University, Bozeman, Montana, Apr. 2019.

(Continued)

*Primary Examiner* — Yogesh Paliwal
(74) *Attorney, Agent, or Firm* — THE MARBURY LAW GROUP PLLC

(57) ABSTRACT

A computer device including a computing engine having a plurality of processor cores configured to simultaneously execute identical sets of processor-executable instructions, where each of the processor cores includes different instruction code assignments, and a malware monitoring and remediation component that detects presence of malware when instruction register values from a predetermined number of processor cores are identical during an instruction cycle. In various embodiments, the computer device may be an "edge" computer deployed in military or other highly-sensitive environments. The computing engine may be implemented using one or more field programmable gate arrays (FPGAs).

20 Claims, 11 Drawing Sheets

(56) References Cited

U.S. PATENT DOCUMENTS

| | | | | |
|---|---|---|---|---|
| 2015/0039864 | A1* | 2/2015 | Tobin | G06F 21/56 |
| | | | | 712/220 |
| 2017/0024268 | A1 | 1/2017 | Kimura et al. | |
| 2018/0052997 | A1* | 2/2018 | Wray | G06F 21/566 |
| 2019/0287607 | A1 | 9/2019 | Koladi et al. | |
| 2020/0076841 | A1* | 3/2020 | Hajimirsadeghi | G06F 18/2136 |
| 2020/0380127 | A1* | 12/2020 | Das | G06F 21/563 |
| 2024/0070275 | A1* | 2/2024 | Cirlig | G06F 21/566 |
| 2024/0126882 | A1* | 4/2024 | Wright | G06F 21/568 |

OTHER PUBLICATIONS

Kc, G.S. et al., "Countering Code-Injection Attacks With Instruction-Set Randomization," CCS '03: Proceedings of the 10th ACM conference on Computer and communications security Oct. 2003, pp. 272-280, https://doi.org/10.1145/948109.948146.

Major, C. M. et al., "RadPC: A Novel Single-Event Upset Mitigation Strategy for Field Programmable Gate Array-Based Space Computing," Journal of Aerospace Information Systems ( IF 1.5 ) , Pub date: Apr. 2, 2021; https://doi.org/10.2514/1.I010859.

Major, Chris Michel, "Novel Approach to Fault Tolerance in Space Computers Leveraging the Risc-V Architecture," Ph.D dissertation orally presented at Montana State University, Bozeman, Montana, in May 2023 (publication not available to the public as of Oct. 10, 2023).

Lameres, B.J. et al., "Fault-Tolerant Computer For Reconfigurable Hardware Devices," U.S. Appl. No. 18/484,106, filed Oct. 10, 2023.

Zuo, S. et al., "Hardware Based RISC-V Instruction Set Randomization," 2022 IEEE International Conference on Integrated Circuits, Technologies and Applications (ICTA), Xi'an, China, 2022, pp. 96-97, doi: 10.1109/ICTA56932.2022.9963094.

* cited by examiner

MALWARE-RESISTANT OBFUSCATED COMPUTER HARDWARE FOR RECONFIGURABLE HARDWARE DEVICES AND METHODS THEREOF

GOVERNMENT SUPPORT

This invention was made with Government support under Contract No. H9240522P0011 awarded by the United States Special Operations Command (USSOCOM). The Government has certain rights in the invention.

FIELD

The present disclosure relates generally to computer systems having enhanced cybersecurity.

BACKGROUND

Advances in integrated circuit fabrication techniques have allowed computer systems to be deployed in a wide variety of situations, including during active military combat operations. For example, the modern special operations forces (SOF) warfighter increasingly relies on wirelessly connected computer systems to maintain an advantage over their adversaries. Interconnected networks of computer systems may be used in every aspect of a mission including in command centers, in space, in ground and flight vehicles, and on the warfighter's person.

While these systems have greatly increased mission capability, they simultaneously present an opening for adversaries to exploit SOF assets through cyberattacks. Of specific concern are attacks that occur in computers that operate at the "edge", or the point of execution. Edge computers are different from those deployed in command centers that typically run sophisticated operating systems and virus scan programs. Edge computers are characterized by the traits that they must perform specific tasks quickly and without disruption. Edge computers typically do not run traditional operating systems, nor do they have the time to run lengthy virus scan procedures. As a result, if an attacker is able to insert malicious software (i.e., malware) into an edge computer, it is rarely detected until the system fails. With edge computers becoming increasingly connected via wireless networking, adversaries have an opening to inject malware without a physical connection. There is a continuing need to improve the cybersecurity capabilities of computer systems, including "edge" computer systems deployed in military or other highly-sensitive environments.

SUMMARY

According to an embodiment of the present disclosure, a computer device includes a computing engine having a plurality of processor cores configured to simultaneously execute identical sets of processor-executable instructions, where each of the processor cores includes different instruction code assignments, a malware monitoring and remediation component that detects presence of malware when instruction register values from a predetermined number of processor cores are identical during an instruction cycle, and a trusted execution environment (TEE) processor configured to receive program code, generate multiple copies of the program code for execution by the plurality of processor cores, obfuscate the instruction codes in each copy of the program code, load the obfuscated instruction codes into instruction memories of the plurality of processing cores, and update instruction decoder tables within each of the plurality of processing cores to enable the processing cores to interpret the obfuscated instruction codes.

According to another embodiment of the present disclosure, a method of operating a computer system includes receiving a first version of machine-readable code, replicating and modifying the first version of the machine-readable code to provide multiple functionally-equivalent instances of the machine-readable code having different instruction code assignments, loading the multiple functionally-equivalent instances of machine-readable code into a plurality of redundant processing cores, where portions of the code are obfuscated such that instruction code assignments for each of the redundant processing cores are different, executing the code using the redundant processing cores, monitoring instruction registers of each of the redundant processing cores while the processing cores execute the code, and detecting the presence of malware when the instruction registers for multiple processing cores have the same value.

DETAILED DESCRIPTION

Figure 1:
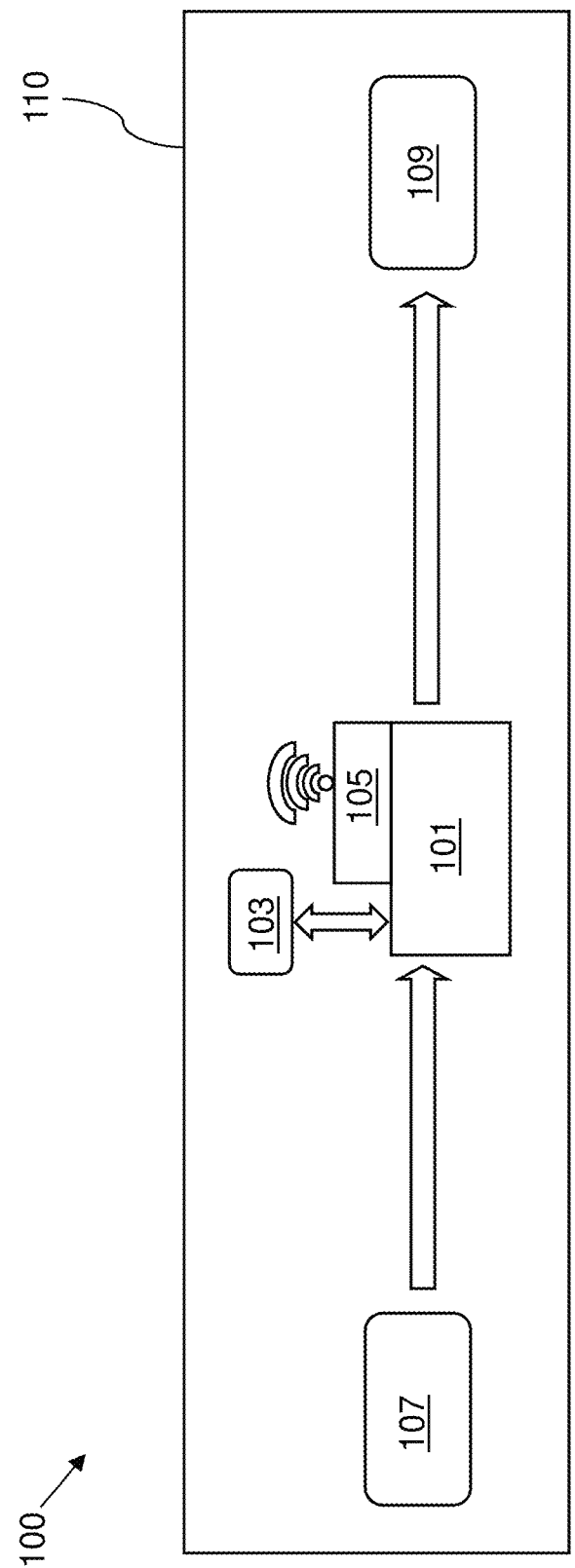
FIG. 1 is a system block diagram schematically illustrating a computer device according to various embodiments of the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The present invention can "comprise" (open ended) or "consist essentially of" the components of the present invention as well as other ingredients or elements described herein. As used herein, "comprising" means the elements recited, or their equivalent in structure or function, plus any other element or elements which are not recited. The terms "having" and "including" are also to be construed as open ended unless the context suggests otherwise. As used herein, "consisting essentially of" means that the invention may include ingredients in addition to those recited in the description and/or claim, but only if the additional ingredients do not materially alter the basic and novel characteristics of the claimed invention.

Any and all ranges recited herein include the endpoints, including those that recite a range "between" two values. Terms such as "about," "generally," "substantially," "approximately" and the like are to be construed as modifying a term or value such that it is not an absolute, but does not read on the prior art. Such terms will be defined by the circumstances and the terms that they modify as those terms are understood by those of skill in the art. This includes, at very least, the degree of expected experimental error, technique error and instrument error for a given technique used to measure a value. Unless otherwise indicated, as used herein, "a" and "an" include the plural, such that, e.g., "a medium" can mean at least one medium, as well as a plurality of mediums, i.e., more than one medium.

Where used herein, the term "and/or" when used in a list of two or more items means that any one of the listed characteristics can be present, or any combination of two or more of the listed characteristics can be present. For example, if a composition of the instant invention is described as containing characteristics A, B, and/or C, the composition can contain A feature alone; B alone; C alone; A and B in combination; A and C in combination; B and C in combination; or A, B, and C in combination.

As discussed above, various improvements are needed in the cybersecurity capabilities of computer systems, including in so-called "edge" computer systems that are deployed and used at the point-of-execution in military and other critical operations. Such edge computer systems present a unique challenge in that the computer systems should ideally be able to detect and defeat malware attacks instantaneously while being deployed but are often without the benefit of existing malware countermeasures that are used in command centers and other fixed locations. However, if an attack mitigation strategy can be successfully deployed in edge computer systems, this may present a unique opportunity for these devices to simultaneously serve as attack monitors at the front line. Since attacks on deployed edge computers will most likely come in the form of electromagnetic energy (EM) (e.g., WiFi, Bluetooth, LTE, 5G), then the wireless peripherals of the edge computer can be used to monitor the amount of EM energy in an area along with whether it has malicious intent (vs. normal network traffic). As a result, advancing technologies that can enable edge computers to detect and mitigate malware will have a twofold benefit in that the computers can be trusted not to fail during critical operation in addition to providing a characterization of the EM energy at the front line.

Various embodiments include computer systems, including edge computer systems and methods thereof, that provide enhanced cybersecurity. Various embodiments may utilize hardware obfuscation to detect and defeat malware attacks. By obscuring the computing hardware, attackers may be prevented from writing effective malware because the target instruction codes being used by the computer system may remain unknown. Only trusted software compiled through a valid and trusted obfuscation tool chain will be able to be executed by the computer system. In various embodiments, the hardware of the computer system may include a plurality of functionally equivalent, redundant processing cores. The processing cores may be implemented on a programmable processing device, such as a Field Programmable Gate Array (FPGA). By using a modern programmable logic device such as an FPGA, the obfuscation can be implemented in the program executable binaries and the instruction decoder hardware in the CPUs simultaneously.

Various embodiments may also include a set of programming tools (i.e., a "tool chain") that may be configured to take standard software programs and compile them for a known computer architecture. The executable binaries may be encrypted and downloaded to one or more end-user computer systems, which may include one or more above-described edge computer systems. A trusted executable environment (TEE) processor within each computer system may decrypt the binaries and verify that they came from a secure source. Once verified, the TEE processor obfuscates the instructions, transfers the new binaries into the instruction memories of the redundant processors on the programmable processing device (e.g., FPGA), and updates the instruction decoders in each redundant CPU accordingly. The result is a set of functionally identical, obscured processing cores running obscured software binaries. If an attacker is able to insert a malicious program into the computing device through its standard peripherals, a voting component on the computing device may be configured to flag the binaries of the malicious program as "unrecognizable," which may initiate a mitigation procedure. Since the malware detection is performed in hardware, detection of the malicious program may occur instantaneously or near-instantaneously (e.g., within 2 clock cycles). Since the original binaries still reside within the isolated TEE processor, the redundant processors of the computer system can either be fully or partially reinitialized to remove the malware and continue normal operation of the computing device.

In various embodiments, the ability of the computer system to rapidly detect and operate through a malware attack provides a unique secondary opportunity to characterize the EM environment of the front-line. An embodiment computer system may be outfitted with wireless peripherals such as WiFi, Bluetooth, LTE, etc. in addition to other custom EM sensors. These wireless ports may enable the computer system to monitor the level of EM radiation in the field while simultaneously checking if the network traffic contains malicious intent such as malware. By monitoring the levels of EM activity and the presence of malware, the computer system according to various embodiments may provide a characterization of the EM profile in the field as an early indication of a rise in malicious malware attacks, which may be, for example, a sign of a potential military escalation.

FIG. 1 is a system block diagram schematically illustrating a computer device 100 according to various embodiments of the present disclosure. The computer device 100 may include a computing engine 101 including at least one processing device and associated memory. In various embodiments described in further detail below, the at least one processing device may include a trusted executable environment (TEE) processor and a processing component including plurality of redundant processor cores (e.g., 2 or more redundant processor cores, such as 3 redundant processor cores, four redundant processor cores, or more than four redundant processor cores). In various embodiments, the TEE processor and/or the processing component including redundant processor cores may be implemented using one or more programmable processor devices, such as one or more field programmable gate arrays (FPGAs). However, it will be understood that other suitable processing devices may be used to implement the TEE processor and/or the processing component including redundant processor cores.

In some embodiments, the computing engine 101 may have a processing speed of at least 48 million instructions per second (MIPS). The computing engine 101 may also include at least 8 kilobytes of instruction memory and at least 4 kilobytes of data memory. The computing engine 101 may include at least 64 parallel input/output (I/O) ports. The computing engine 101 may also support serial communication, such as at least two Universal Asynchronous Receiver-Transmitter (UART) connections, at least two Serial Peripheral Interface (SPI) connections, and/or at least two Inter-Integrated Circuit (I2C) connections. The computing engine 101 may also provide support for at least one wired connection to the computer device 100. However, it will be understood that various embodiments may be implemented using a wide variety of computer architectures having different processing speeds, memory capacities, and I/O capabilities. For example, computing engines 101 having relatively low processing speeds may be advantageous for low-power applications.

The computer device 100 may also include at least one user input component 101 operatively coupled to the computing engine 101. The user input component 103 may include, for example, a keypad device, a touchscreen device, a mouse, a trackball, a touch pad, a microphone, or the like.

The computer device 100 may also include an EM shield component 105 operatively coupled to the computing engine 101. The EM shield component 105 may include one or more electromagnetic (EM) radiation sensors configured to detect EM signals in the vicinity of the computer device 100. In some embodiments, the EM shield component 105 may support wireless connectivity of the computer device 100 using one or more wireless communication interfaces. Providing wireless connectivity capabilities in the computer device 100 may provide a number of advantages. A first advantage is that this may enable a deployed edge computer device 100 to be linked with other similar devices as well as to command center(s). A second advantage of having wireless connectivity capabilities is that it may provide a straightforward way for the computer device 100 to monitor the existing EM environment. This may be useful, for example, for packet sniffing of traditional internet traffic to watch for malicious intent or general increased activity.

In various embodiments, the EM shield component 105 may include wireless transceiver circuitry that may support one or more wireless communication protocols. For example, the EM shield component 105 may support wireless communication using an IEEE 802.11 standard interface (e.g., WiFi™) and/or a Bluetooth® interface. Other wireless communications interfaces may also be utilized by the EM shield component 105, such as UHF/VHF, LTE, and 5G, as well as other specialized wireless communications protocols, including classified EM radio technologies.

In some embodiments, the various wireless communication interfaces may be implemented as daughter cards that may be controlled via the serial/parallel I/O ports of the computing engine 101 (i.e., they do not need to be embedded with the hardware description language (HDL) of the computing engine 101). In some embodiments, the EM shield component 105 may be a unitary component that may be plugged into a computer board of the computer device 100. Thus, the underlying architecture of the computing engine 101 may not be modified, and communication with the EM shield component 105 may be through the existing peripheral ports (e.g., parallel I/O, UART, SPI, I2C, etc.). This approach may enable the EM shield component to contain a variety of standard and/or non-standard radio technologies, potentially including future-developed technologies. Using a variety of radio bands and EM transceivers enables the computing device 100 to serve as an EM probe with the added feature that it is malware resistant. This application may give the computing device 101 a dual-purpose for an SOCOM warfighter.

In some embodiments, the computer device 100 may also include a camera 107 and a display 109 operatively coupled to the computing engine 101. Thus, in various embodiments the computer device 100 may include a camera-to-display system in which images captured by the camera 107 may be processed by the computing engine 101 and displayed in real-time on the display 109. In one non-limiting embodiment, both the camera 107 and the display 109 may have a resolution of at least 640×480. The camera 107 may have an image offload rate of at least 15 MHz and the display 109 may have a refresh rate of at least 15 MHz. In some embodiments, the computer device 100 may support at least two modes of image acquisition, processing, and display, including a raw image mode with pattern overlay, and an edge detection mode. In raw image mode, the computing engine 101 may be configured to overlay basic patterns (e.g., circles, arcs, squares, etc.) on the image to highlight areas of interest, such as regions of EM traffic or other regions of interest identified using a pattern recognition algorithm. The edge detection mode of the computer device 101 may include 1D and/or 2D edge detection. In 2D edge detection mode, the computing engine 101 may be configured to perform a Gaussian blur pre-processing algorithm on the image data before performing a 3×3 pixel edge detection process. In some embodiments, both the camera 107 and the display 109 may be commercial off-the-shelf (COTS) components.

The various components of the computer device 100 shown in FIG. 1, such as the computing engine 101, the input device 103, the EM shield component 105, the camera 107, and the display 109, may be located on and/or within a suitable enclosure 110. The computer device 100 may have a suitable form factor for use, for example, as a handheld device, as a body-worn system, in an arial platform, and/or for use in satellites or other spacecrafts.

Figure 2:
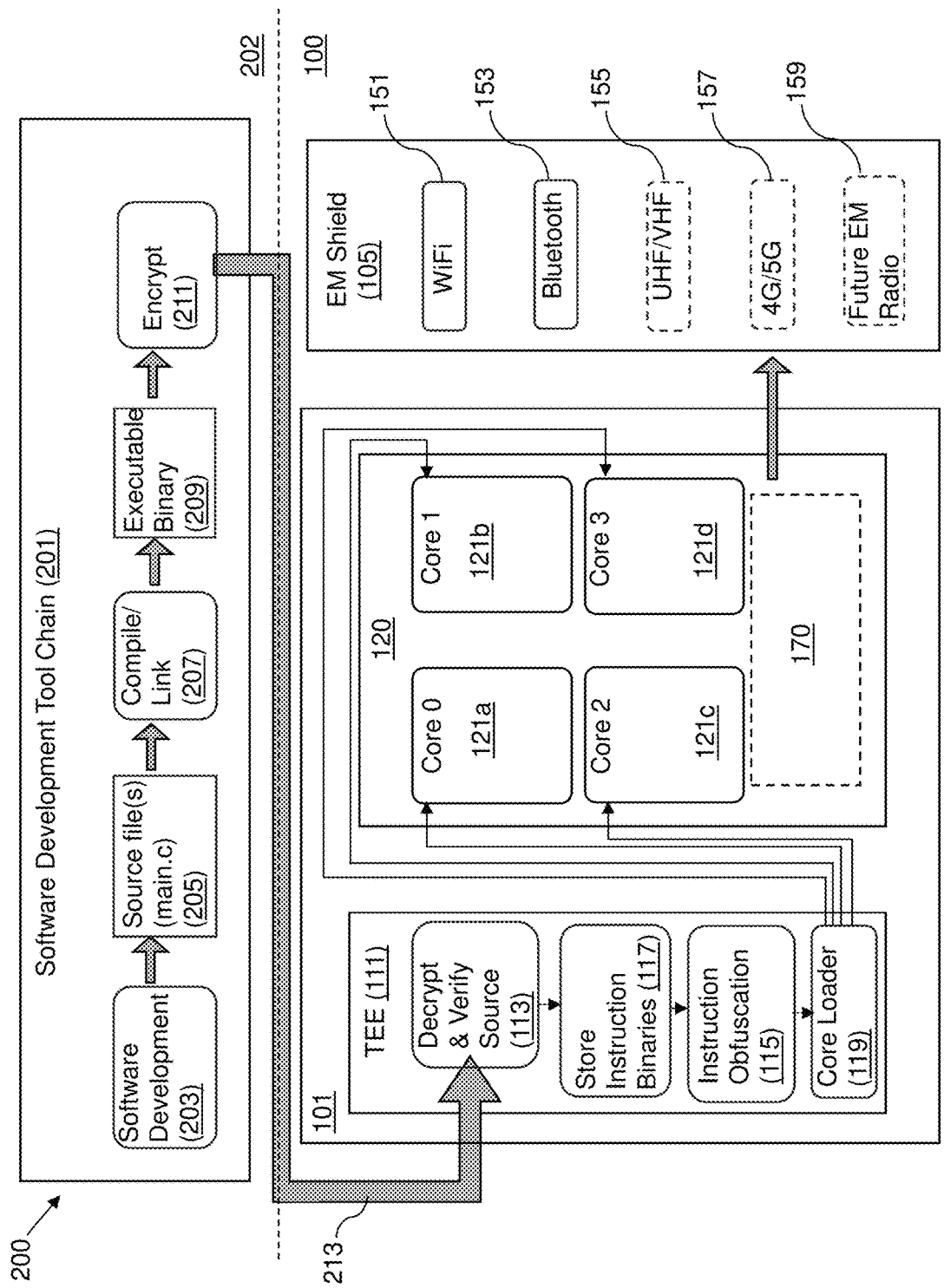
FIG. 2 is block diagram schematically illustrating a system for providing enhanced cybersecurity according to various embodiments of the present disclosure.

FIG. 2 is block diagram schematically illustrating a system 200 for providing enhanced cybersecurity according to various embodiments of the present disclosure. The system 200 of FIG. 2 includes one or more external entities/components 202 that may be configured to perform a set of programming operations to provide secure executable software code for execution on one or more computer devices 100, such as a computer device 100 described above with reference to FIG. 1. The various programming operations performed externally to the computer device(s) 100 may be collectively referred to as a "software development tool chain" 201. The software development tool chain 201 may include an initial software development process as schematically indicated by block 203 in FIG. 2. Software program(s) may be developed specifically for use by the computer device(s) 100, and/or may be existing commercial and/or open-source programs developed by independent third parties. The output of the software development process may be one or more source files 205, which may be written in suitable programming language(s) (e.g., C, assembly language, etc.).

Referring again to FIG. 2, the source file(s) 205 may be subjected to a compilation and linking process, as schematically indicated by block 207. The compilation process may include converting the source code in the source file(s) 205 into a machine-readable object file(s). The linking process may include combining multiple object files to provide a single executable file. The output from the compilation and linking processes may include one or more binary files 209 that may include executable code. An encryption process may then be performed as indicated in block 211 of FIG. 2. The encryption process may use a suitable encryption algorithm to encrypt the one or more binary files to provide encrypted binary file(s) that may not be readable or executable without first decrypting the file(s) using the appropriate cryptographic key.

The encrypted binary file(s) may then be provided to the computer device 100 as schematically indicated by arrow 213 in FIG. 2. In some embodiments, the encrypted binary file(s) may be transmitted from a central server or other repository to the computer device 100 via a wired or wireless link. In some embodiments, the encrypted binary file(s) may be downloaded to a particular computer device 100 in response to a request from the computer device 100. Alternatively, the encrypted binary file(s) may be "pushed" from a central server to one or more computer devices 100.

Referring again to FIG. 2, the encrypted binary file(s) received by the computer device 100 may be processed by a trusted executable environment (TEE) processor 111 of the computer device 100. As discussed above, the TEE processor 111 may form a part of the computing engine 101 of the computer device 100. However, the TEE processor 111 may operate separately from the processing component 120 of the computing engine 101 that includes multiple redundant processing cores 121a-121d. In some embodiments, the TEE processor 111 and the processing component 120 including redundant processing cores 121a-121d may be implemented using the same processing hardware (e.g., on a single FPGA). Alternatively, the TEE processor 111 and the processing component 120 may implemented using different processing hardware components (e.g., on separate FPGAs or other chips).

The TEE processor 111 may be configured to perform a number of processes, including performing a decryption and verification of the received executable binaries (block 113), storing the original binaries in memory (block 115), performing an obfuscation of the instruction codes of the executable binaries (block 117), and loading the obfuscated instruction codes into the instruction memories of the redundant processing cores 121a-121d of the processing component 120 (block 119).

In block 113, the TEE processor 111 may utilize a decryption algorithm and the appropriate cryptographic key to decrypt the encrypted binaries and recover the original executable code. The TEE processor 111 may also perform a verification process, such as using a keying system, to confirm that the received file(s) are from a trusted source.

In block 115, the TEE processor 111 may then store the original program executable file(s) in an internal non-volatile memory. In various embodiments, a single copy (i.e., a "golden copy") of the original program may be maintained in memory. This may enable the computer device 100 to quickly recover from a successful malware infiltration by fully restoring the instruction memories of the redundant processing cores 121a-121d of the processing component 120 without requiring another download of the full program from a central server.

In block 117, the TEE processor 111 may be configured to replicate and obfuscate the instruction codes of the original program. In one non-limiting embodiment, the TEE processor 111 may use a random number generator algorithm to create a set of obfuscated instruction codes known only to the TEE processor. The random number generator algorithm implemented by the TEE processor may also allow the obfuscated cores to be changed each time a malware attack is detected to further increase the intrusion tolerance of the computing device 100.

In block 119, the TEE processor 111 may load the obfuscated instruction codes into the instruction memories of the redundant processing cores 121a-121d of the processing component 120. The TEE processor 111 may also update the instruction decoder tables within each of the processing cores 121a-121d so that they can interpret the new instruction codes. The redundant processing cores 121a-121d may then execute the program with the obfuscated instruction codes. The processing component 120 may further include a malware monitoring and remediation component 170 as described in further detail below.

The use of a TEE processor 111 as shown in FIG. 2 within the computer device 100 may provide increased efficiency since only a single copy of the original program may be stored on the computer device 100, which may enable fast recovery of the CPU with relatively minimal memory requirements. Providing the TEE processor 111 with the capability to verify the source program may also help to eliminate an attack vector through a download port. However, it will be understood that in other embodiments, a TEE processor 111 as shown in FIG. 2 may not be utilized. For example, in some embodiments the step of obfuscating the instruction codes (i.e., block 117 in FIG. 2) may be performed upstream of the computer device 100, such as within the software development tool chain 201. The obfuscated instruction codes may be downloaded to the computer device 100 and loaded into the respective processing cores 121a-121d. However, in such embodiments, redundant copies of each of the obfuscated instruction codes may need to be stored in memory on the computer device 100 in order to enable recovery in case of malware intrusion or other failures, which may require additional memory capabilities for the device 100.

FIG. 2 also schematically illustrates the above-described EM shield component 105 of the computer device 100. As discussed above, the EM shield component 105 may include a plurality of wireless communication interfaces, such as a WiFi™ interface 151, a Bluetooth® interface 153, a UHF/VHF interface 155, a 4G/5G interface 157, and/or a future EM radio technology interface 159.

Figure 3:
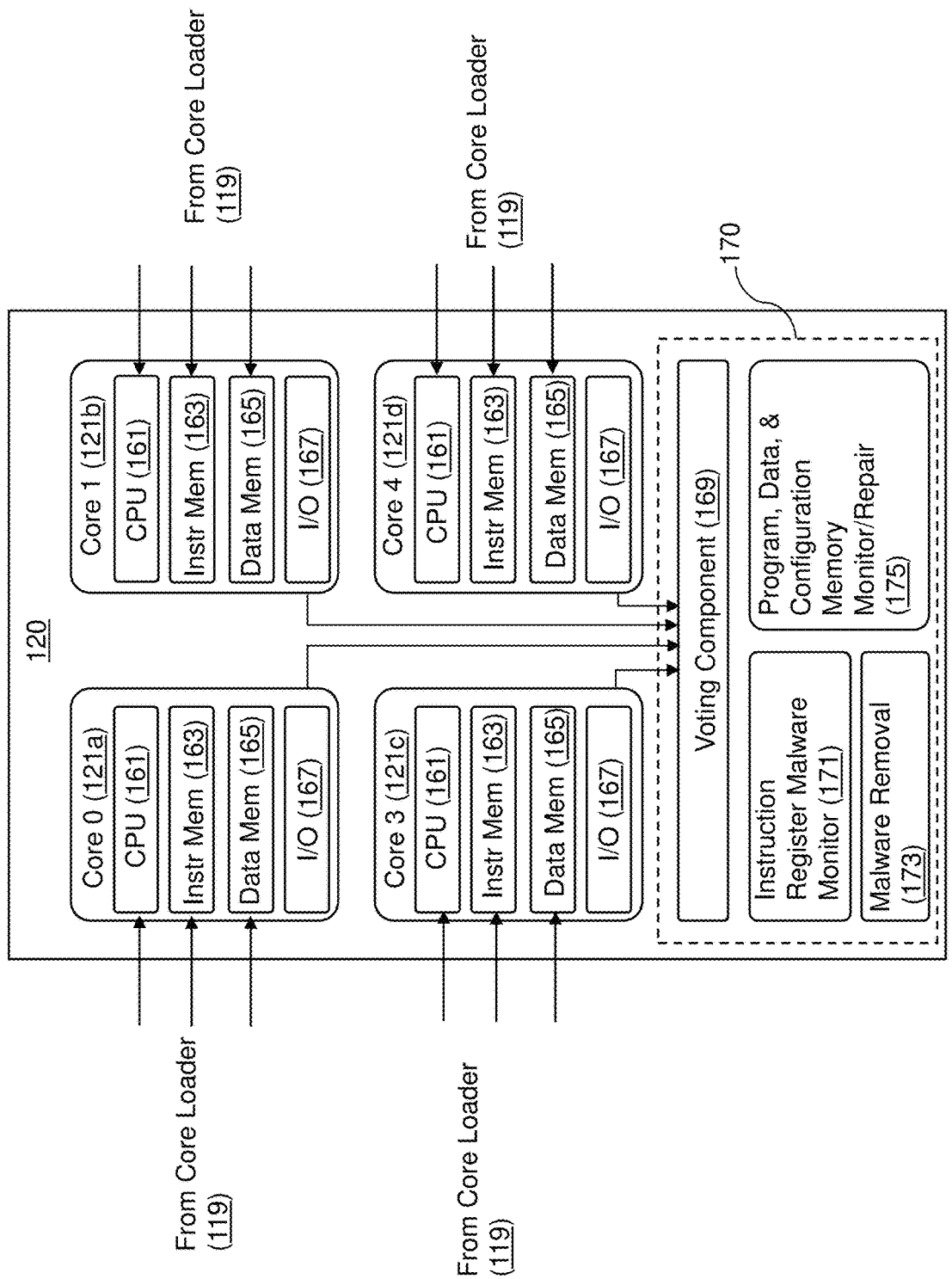
FIG. 3 is a system block diagram illustrating a processing component including redundant processor cores in a computer device according to various embodiments of the present disclosure.

FIG. 3 is a system block diagram that further illustrates the processing component 120 including the redundant processor cores 121a, 121b, 121c and 121d in a computer device 100 according to various embodiments of the present disclosure. In various embodiments, the processing component 120 implements redundant processing cores 121a, 121b, 121c and 121d, each with different instruction code assignments. The processing cores 121a, 121b, 121c and 121d may otherwise include identical architectures, may run in lockstep with one another, and may operate as a single computing node for the user. At any given time, each processing core 121a, 121b, 121c may execute the same instruction but with different instruction code assignments.

In various embodiments, processing component 120 may be designed such that the respective instruction codes that are executed by the different processing cores 121a, 121b, 121c and 121d any given time are never the same. Thus, if the same instruction codes are observed across multiple, such as all of the, redundant processing cores 121a, 121b, 121c and 121d, this may be an indication that malware has been successfully injected into the computer device 100, and appropriate remedial action may be taken. The particular remedial actions taken in response to a malware attack may be application-specific, but may include, for example, removing the malware and restoring the original obfuscated instruction binaries, halting the system for manual intervention, and/or quarantining the malware for cyber-forensics.

In various embodiments, the processing component 120 including the redundant processor cores 121a, 121b, 121c and 121d may be implemented using an FPGA. FPGAs are digital logic devices that can be configured into any desired computational architecture. They are a well-established technology with commercial off-the-shelf (COTS) availability, competitive pricing, and extensively-supported design and development environments. An FPGA can implement a computing system with extra features not available with commercial microcontrollers, including error-checking mechanisms for computational performance. FPGAs can also offer performance increases through parallelism.

It can also be relatively straightforward to implement logic redundancy on an FPGA by reusing pre-defined modules of logic circuitry. Thus, FPGAs may be used as a means of establishing redundancy. Most importantly, FPGAs can be reconfigured as needed when any portion of its logic is faulted or affected. This feature, known as Full Reconfiguration (FR) when all of the logic is fully reset to a known state, and Partial Reconfiguration (PR) when only a portion of the logic is reset, can be used as a means of self-repair in response to a malware intrusion or other failure mode.

A logic circuit may be designed in an FPGA using a hardware description language (HDL) and a dedicated synthesis tool to convert the described circuitry into real-time logic (RTL) that the FPGA can run. Popular HDLs include VHDL and Verilog. The synthesis tool also allows a developer to configure timing, logic placement and routing, and generate output files (such as bitstreams) to be deployed onto an FPGA during regular operations. Some synthesis tools even allow for live debugging of an FPGA's internal logic.

Referring again to FIG. 3, each of the redundant processing cores 121a, 121b, 121c and 121d of the processor component 120 may include a CPU 161, an associated instruction memory 163, an associated data memory 165, and an input/output component 167. In various embodiments, each of the CPUs 161 may be a softcore processor utilizing an open source instruction set architecture (ISA). In some embodiments, the softcore processors 161 may include custom-built RISC-V softcore processors.

The RISC-V processor architecture has gained popularity over the last few years, having developed an accessible ecosystem for implementation and use in digital systems. The open-source Instruction Set Architecture (ISA) supports several different types of processor cores, allowing 32-bit, 64-bit, and even 128-bit configurations. Multiple versions of complete instruction sets are offered, ranging from basic integer operations to floating-point calculations and more. The most basic functional RISC-V variant is the RV32I, with 40 instructions necessary to run any basic C program. The RISC-V ISA has been adopted into a wide variety research and technologies, with several examples of RISC-V softcore processors being integrated into FPGA designs. However, it will be understood that various embodiments may utilize other processor architectures, such as ARM processors, SPARC processors, RISC-x processors, and the like.

Referring again to FIG. 3, initial configurations of the CPU 161, the instruction memory 163, and the data memory 165 for each of the redundant processing cores 121a, 121b, 121c and 121d may be provided by the core loader 119 of the TEE processor 111. As discussed above, the TEE processor 111 may obfuscate the instruction codes loaded into the instruction memories 163 of each processing core 121a, 121b, 121c, and 121d, and may also update the instruction decoder tables within each of the processing cores 121a, 121b, 121c, and 121d so that each core 121a, 121b, 121c, and 121d can interpret the obfuscated instruction codes. Thus, during runtime, each redundant processing core 121a, 121b, 121c, and 121d may simultaneously execute the same instruction but with different instruction code assignments that are known only to the respective processing core 121a, 121b, 121c, and 121d. Ideally, the instruction codes during execution of the same instruction should never match between two or more of the processing cores 121a, 121b, 121c, and 121d.

Referring again to FIG. 3, the processor component 120 may also include a malware monitoring and remediation component 170. The malware monitoring and remediation component 170 may be configured to monitor the redundant processing core 121a, 121b, 121c, and 121d during program execution to determine whether or not a malware penetration has occurred, and to perform one or more remedial actions in response to determining that a malware penetration has occurred. In one non-limiting embodiment, the malware monitoring and remediation component 170 may include a voting component 169 coupled to an instruction register malware monitor 171. The voting component 169 may be configured to route a majority value from four inputs (i.e., one from each redundant processing core 121a, 121b, 121c and 121d) while also reporting any disagreements between the inputs. In some embodiments, the voting component 169 may be a combinational logic circuit to limit the time it takes to evaluate component outputs.

In various embodiments, the input signals to the voting component 169 may include instruction register values from each of the redundant processing cores 121a, 121b, 121c, and 121d. As discussed above, during normal operation, each of the redundant processing cores 121a, 121b, 121c, and 121d has different instruction code assignments. Thus, during each instruction cycle, the instruction register values from the redundant processing cores 121a, 121b, 121c, and 121d should not match. However, when malicious code is executed by the redundant processing cores 121a, 121c, and 121d, multiple processing cores 121a, 121b, 121c and 121d may have identical instruction register values. The instruction register malware monitor 171 may monitor the output from the voting component 169 and may flag for the presence of malware when the instruction register values of a predetermined number (e.g., ≥2, such as 3, or all 4) of the redundant processing cores 121a, 121b, 121c and 121d are identical during a given instruction cycle. This may trigger the malware monitoring and remediation component 170 to initiate one or more remedial actions, such as removing the malware and restoring the original obfuscated instruction binaries, halting the system for manual intervention, and/or quarantining the malware for cyber-forensics. In some embodiments, a malware removal component 173 may be configured to remove the malware-infected code from the processing cores 121a, 121b, 121c, and 121d. A program, data, and configuration memory monitor/repair component 175 may be configured to restore the processing cores 121a, 121b, 121c, and 121d to a known good state. In some embodiments, this may include causing the TEE processor 111 to access the original instruction binaries (i.e., the "golden" copy) from memory, replicate the instruction binaries and obfuscate each copy of the instruction codes, load the instruction binaries into each of the redundant processor cores 121a, 121b, 121c and 121d, and update the instruction decoder tables within each of the processing cores 121a, 121b, 121c, and 121d with the new instruction code assignments. The processing cores 121a, 121b, 121c and 121d may then resume program execution. In some embodiments, the malware removal and remediation process may occur within 3 clock cycles, such as within 2 clock cycles, of the initial detection of a malware intrusion.

Referring again to FIG. 3, the malware monitoring and remediation component 170 may optionally include other system monitoring and remediation components, such as described in U.S. patent application Ser. No. 18/484,106, filed on Oct. 10, 2023, the entire contents of which are incorporated by reference herein for all purposes. For example, one or more memory scrubber(s) may be utilized to correct for memory corruption due to a malware attack or other fault condition(s). For example, a memory scrubber may continually and iteratively monitor the local memory, including the instruction memory 163 and/or the data memory 165, of each processing core 121a, 121b, 121c and 121d as a background process via backdoor access ports, and may include a voting component to detect errors and rewrite corrected memory values. In some embodiments, soft error mitigation (SEM) circuit may serve as a scrubber specifically designed for configuration memory.

Figure 4:
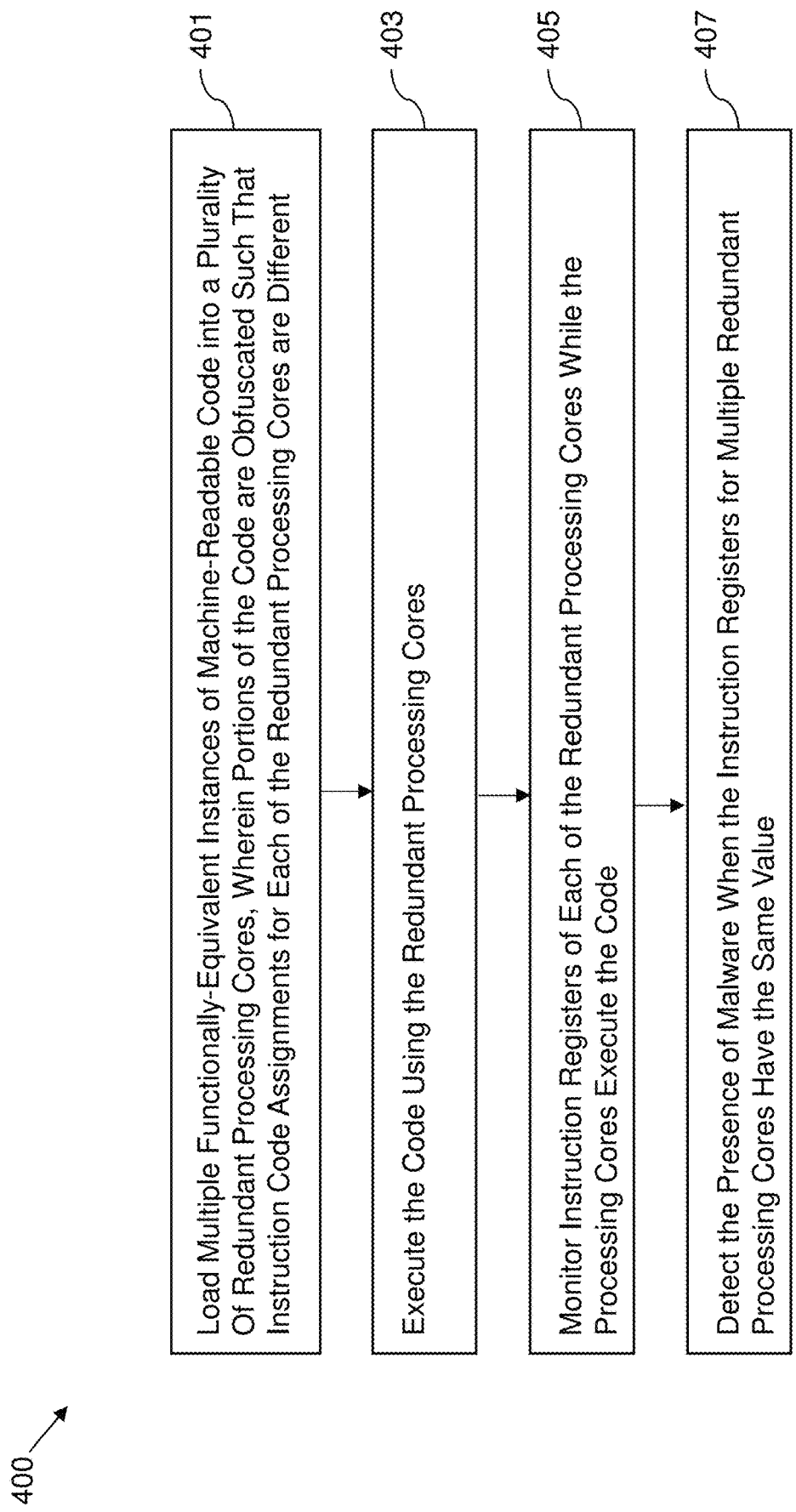
FIG. 4 is a flow diagram that illustrates a method of detecting malware on a computer device according to various embodiments of the present disclosure

FIG. 4 is a flow diagram that illustrates a method 400 of detecting malware on a computer device 100 according to various embodiments of the present disclosure. Referring to FIG. 4, in block 401 of method 400, multiple functionally-equivalent instances of machine-readable code may be loaded into a plurality of redundant processing cores 121a, 121b, 121b and 121d, where portions of the code are obfuscated such that instruction code assignments for each of the redundant processing cores 121a, 121b, 121b and 121d are different. In some embodiments, the portions of the code may be obfuscated using an on-board trusted execution environment (TEE) processor 111. In other embodiments, the portions of the code may be obfuscated at an earlier portion of the software toolchain, such as during the compilation process.

In block 403 of method 400, the code may be executed by the redundant processing cores 121a, 121b, 121b and 121d. In various embodiments, each of the processing cores 121a, 121b, 121c, and 121d may simultaneously execute the same set of instructions but with different instruction code assignments. In block 405 of method 400, the instruction registers of each of the redundant processing cores 121a, 121b, 121b and 121d may be monitored while the processing cores 121a, 121b, 121b and 121d execute the code. In some embodiments, this may include utilizing a voting mechanism to determine whether or not the instruction register values in the instruction registers of the redundant processing cores 121a, 121b, 121b and 121d agree. Because each of the processing cores 121a, 121b, 121c and 121d is provided with different instruction code assignments, during normal operation (i.e., operation that is unaffected by malware) the instruction register values should be different between the respective processing cores 121a, 121b, 121c and 121d. In block 407 of method 400, the presence of malware may be detected when the instruction registers for multiple processing cores 121a, 121b, 121c and 121d have the same value. This may indicate that malicious code has penetrated the computer device and is being executed by processing cores 121a, 121b, 121c and 121d.

Example

A proof-of-concept computer system was built including redundant processor cores on a single FPGA. The redundant processor cores included identical architectures and were designed to operate as a single computing node. At any given time, each of the processor cores is configured to execute the same instruction but with different instruction code assignments. By design, the instruction codes for the instructions being executed by the CPUs at any given time are not the same.

The use of an FPGA as the hardware platform for the computer system enabled compile-time obfuscation. Since the FPGA design was created using a hardware description language (HDL), which is simple text, the design can be easily manipulated using scripting tools during compilation. The proof-of-concept computer system differed from the computer device 100 shown in FIG. 2 in that the device lacked an on-board trusted execution environment (TEE) processor 111. Rather, the software tool chain for the proof-of-concept computer system included compiling the source code for the target CPU architecture, replicating and obfuscating the instruction codes, and then generating the HDL for the instruction memories and CPU instruction decoders for the redundant processor cores. The result of this tool chain was a set of VHDL files describing a fully redundant, obfuscated computer system that could be synthesized using a standard FPGA tool.

Figure 5:
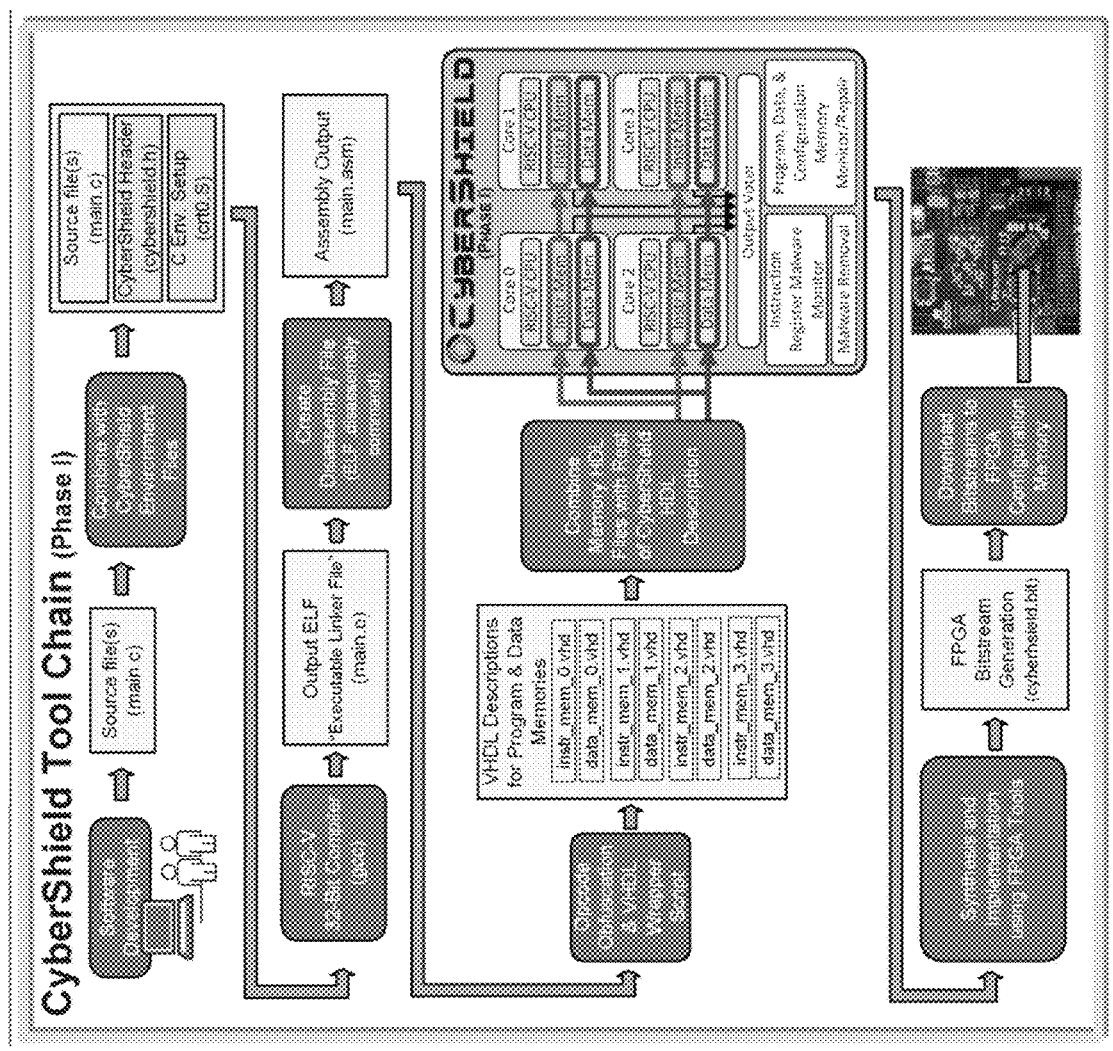
FIG. 5 is a block diagram schematically illustrating a tool chain for a proof-of-concept computer system according to various embodiments of the present disclosure.

Proof-of-concept testing included taking in a simple assembly code program and producing the obfuscated HDL for a basic 4-instruction computer. The computer was adapted to use the emerging RISC-V integrated instruction set (ISA) architecture. This allowed the use of existing open-source compilation tools that supported both assembly and C programming languages and abstracted the underlying computer hardware from the software developer. A full HDL implementation of a 32-bit RISC-V computer was developed that could accept compiled binaries from the RISC-V ISA written in either assembly or C. The obfuscation algorithms were embedded into the RISC-V ISA tool chain, which allowed the HDL for the instruction memories and CPU instruction decoders to be automatically generated at compile-time. Once the obfuscated portions of code were created, they were combined with the rest of the computer system HDL to form a complete description of the computer system. The full HDL design was then able to be synthesized using a standard FPGA design tool. FIG. 5 schematically illustrates the resulting tool chain that was created for proof-of-concept testing.

Figure 6:
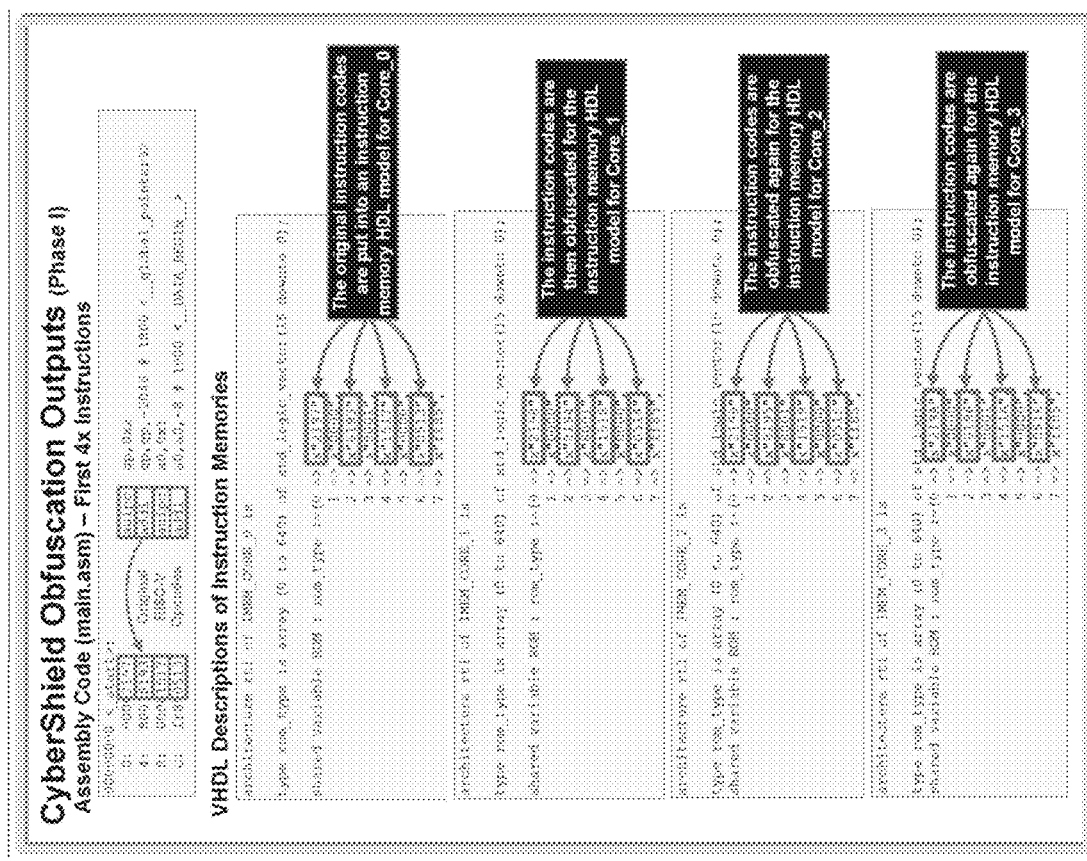
FIG. 6 is an illustration showing examples of the assembly language output of the RISC-V compilation for a C source code input according to various embodiments of the present disclosure.

To help visualize how the instruction codes were obfuscated, FIG. 6 illustrates examples of the assembly language output of the RISC-V compilation for a C source code input. This assembly output contains both the instruction mnemonics along with the instruction binaries for each instruction. The obfuscation algorithm then produced four HDL models of the instruction memories for the four redundant processing cores of the computer system. In each HDL model, the instruction codes are obfuscated from the original instruction assignments. For the proof-of-concept testing, the instruction codes were simply incremented by 1 (i.e., x2197→x2198→x2199→x219A) to accomplish the obfuscation. However, it will be understood that other methods for achieving obfuscation, such as the use of a random number generator-based algorithm, may be used for obfuscation in various embodiments.

Figure 7:
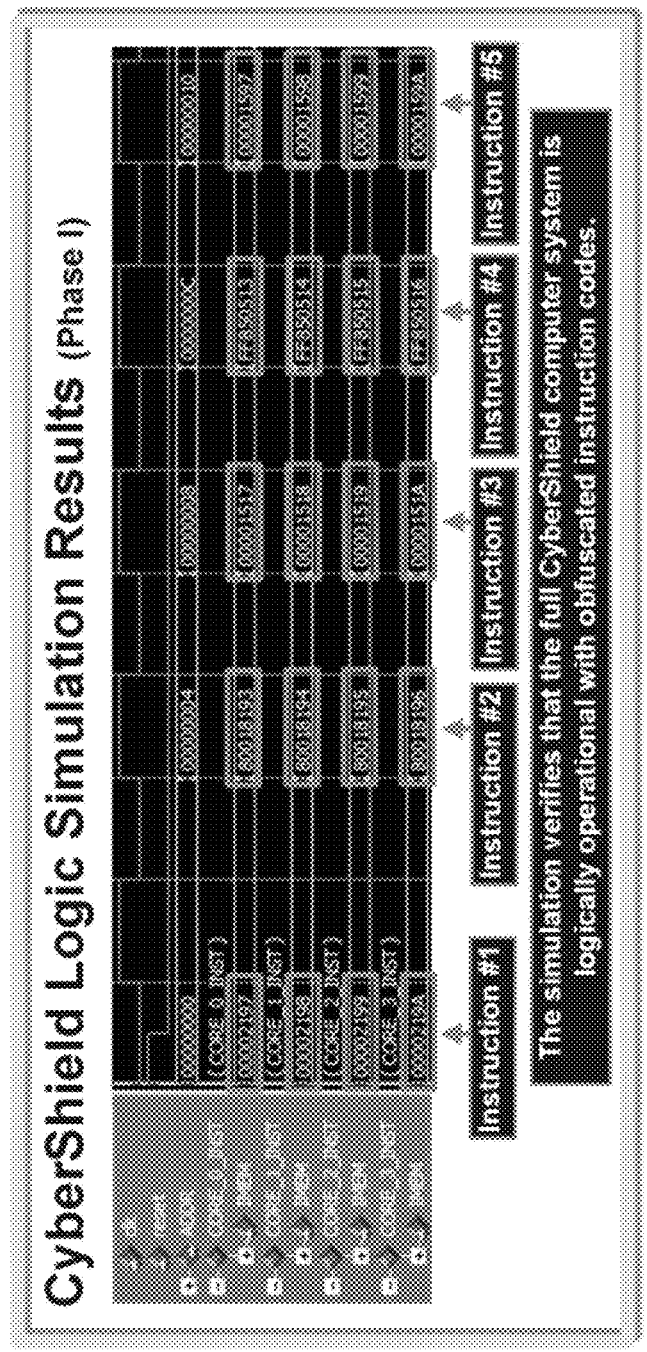
FIG. 7 is a screenshot showing results of a logic simulation that was performed which illustrates how the obfuscated instruction codes appear during normal operation according to various embodiments of the present disclosure.

FIG. 7 shows results of a logic simulation that was performed which illustrates how the obfuscated instruction codes appear during normal operation. As shown in FIG. 7, during each instruction cycle (i.e., Instruction #1 through Instruction #5), the instruction codes for the four redundant processing cores (Core_0, Core_1, Core_2, and Core_3) are always different.

Malware-injection testing was performed while the computer system was performing normal processing operations. It was determined that during the penetration testing, the computer system should a program relevant to a special operations forces (SOF) environment that would also stress the computational load on the computer. It was decided that image processing would be of particular interest due to its use in satellite imaging, arial monitoring, and soldier-worn body cameras. Accordingly, a camera-to-display image processing system was developed using the proof-of-concept computer system as the computational engine.

Figure 8:
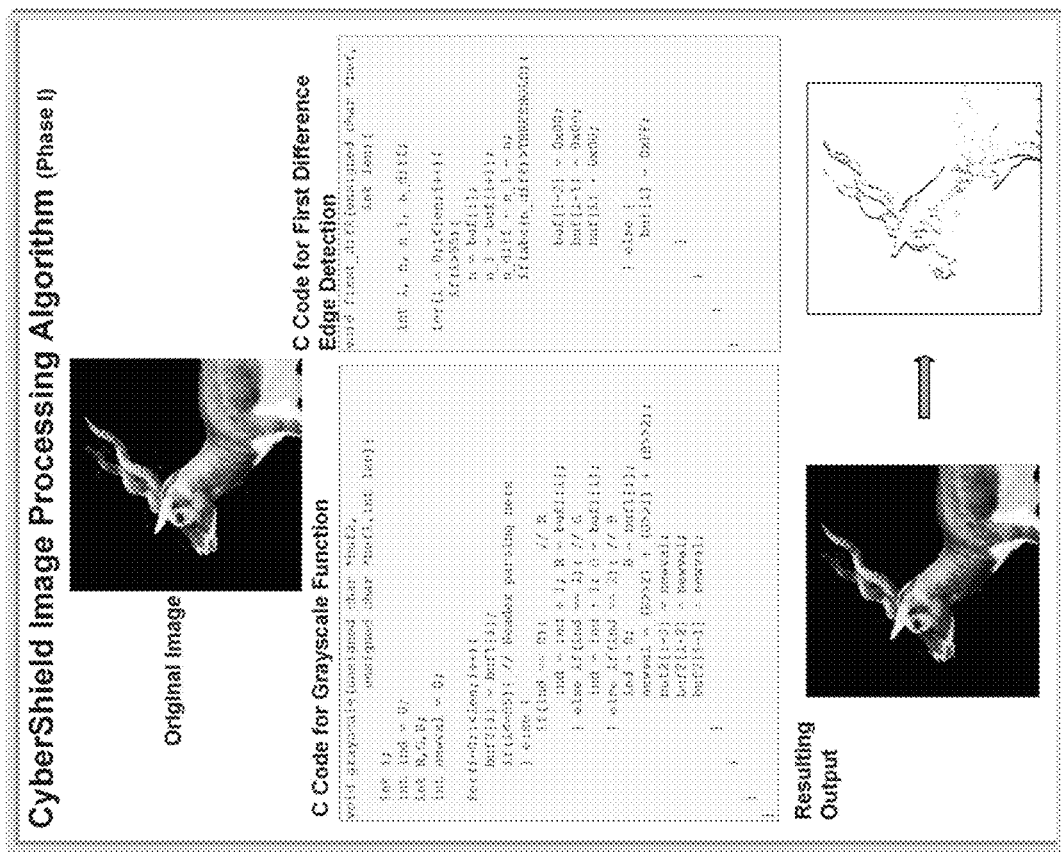
FIG. 8 is an illustration showing image processing routines and workstation test results according to various embodiments of the present disclosure.

Software was written for the proof-of-concept computer system in C that implemented two image processing modes. The first was Raw Image Mode in which data was received from the camera, reformatted for the target display's RGB resolution, and then streamed directly to a display. The second processing mode was Edge Detection in which a grayscale pre-processing conversion was first performed on the incoming data followed by a 1D difference algorithm. The output of edge detection algorithm is a black and white image with asserted pixels representing edges in the camera data. The image processing algorithms were first tested on a workstation prior to implementation using the proof-of-concept computer system. The image processing routines and workstation test results are shown in FIG. 8.

Figure 9:
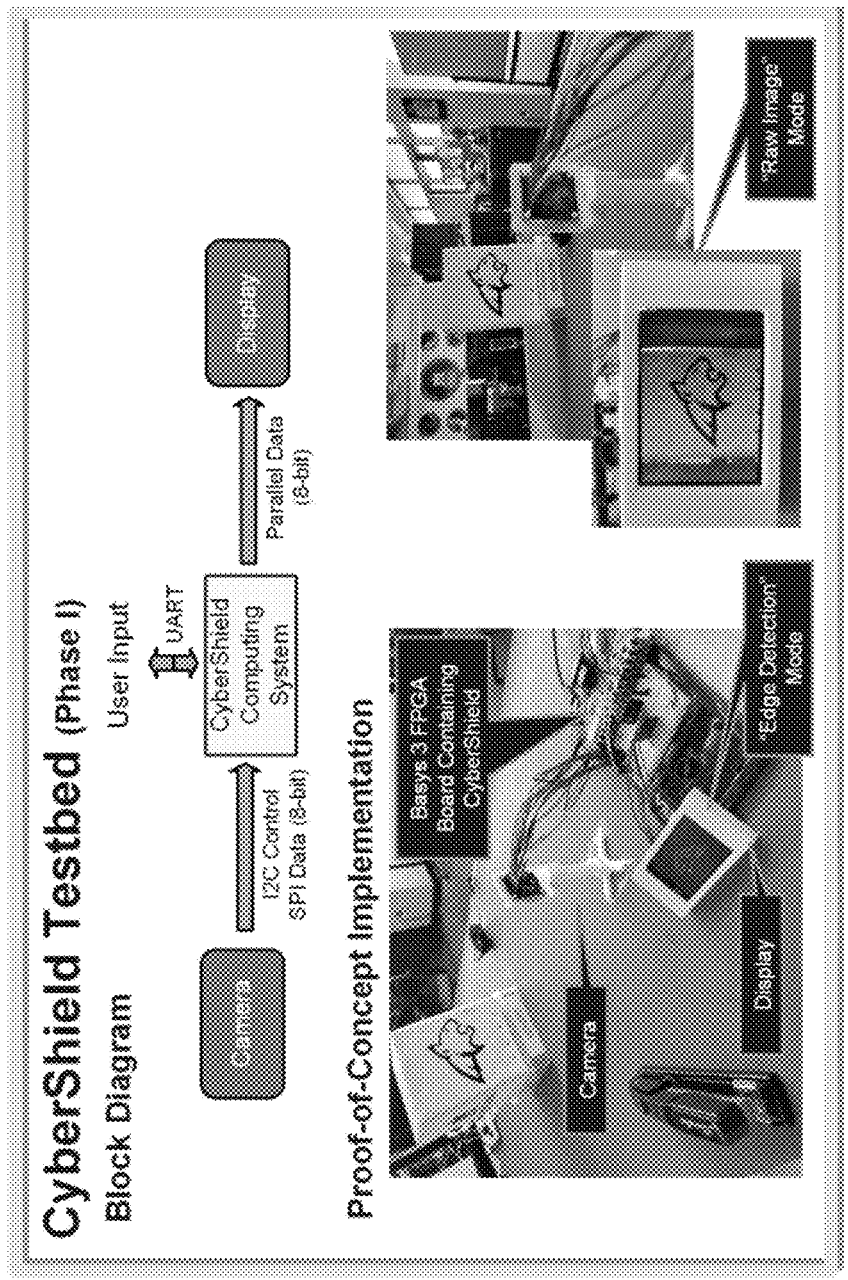
FIG. 9 is a photograph illustrating a testbed for real-time camera image processing using a proof-of-concept computer system along with the output results for both raw image and edge detection modes according to various embodiments of the present disclosure.

A prototype system was then developed to enable the proof-of-concept computer system to process camera data in real-time. An Adafruit TTL 640×480 CMOS imager with an NTSC protocol was selected for the camera. This camera required SPI and I2C serial peripherals to be added to proof-of-concept system. A Sparkfun 2.8" TFT 320×240 RGB LCD was selected as the display. The parallel I/O ports of the proof-of-concept system were used to stream data to the display. The proof-of-concept computer system was implemented on a Basys 3 development board containing a Xilinx Artix-7 100T FPGA. A user could switch between raw image and edge detection mode from a computer, which required a UART peripheral to be added to the computer system. The UART link also introduced an attack vector for the computer system that could be used to inject malware. FIG. 9 is a photograph illustrating the testbed along with the output results for both raw image and edge detection modes.

Figure 10:
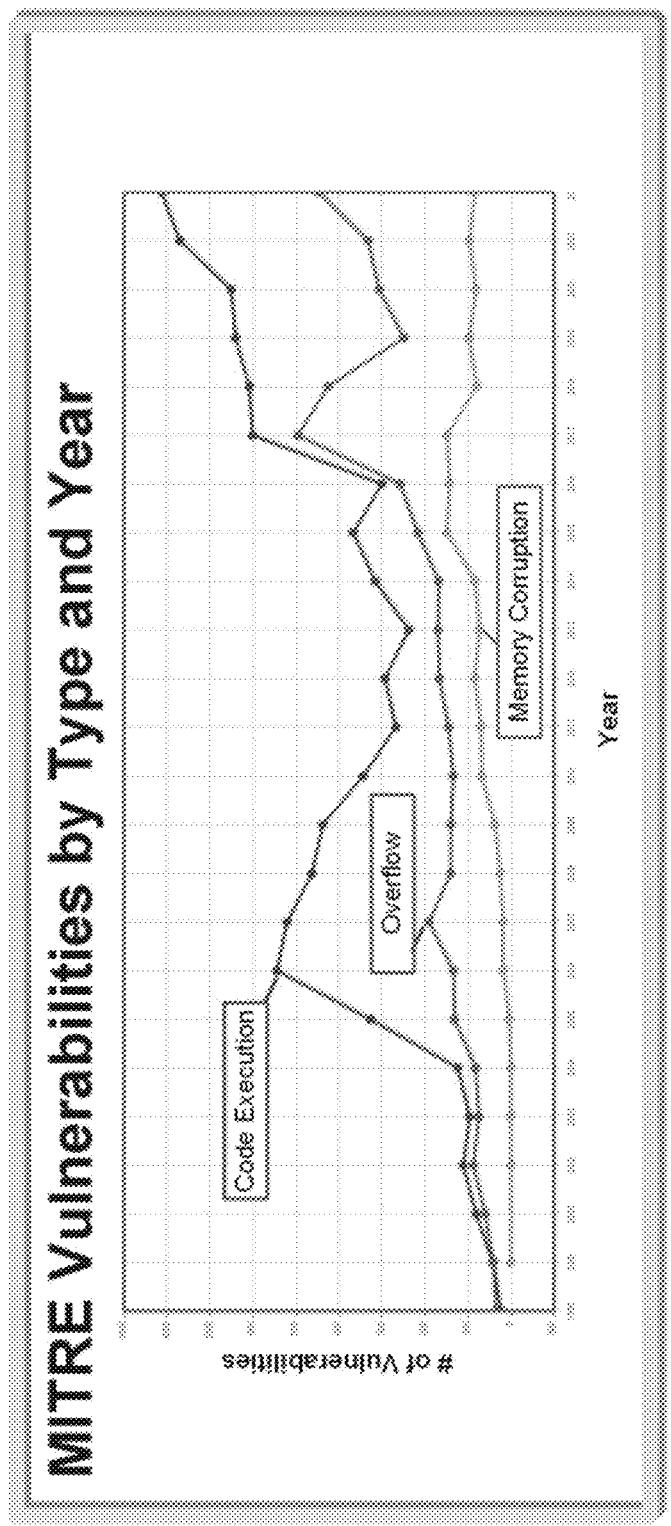
FIG. 10 is a plot that illustrates the incidences of common vulnerabilities and exposures (CVE) over time.

The proof-of-concept computer system was then subjected to malware penetration testing. The capabilities (and vulnerabilities) of the proof-of-concept computer system were evaluated against the MITRE (mitre.org) cyberattack database so that an appropriate attack could be designed. MITRE maintains a list of Common Vulnerabilities and Exposures (CVEs), which provide a common reference for specific security issues. The incidence of certain classes of vulnerabilities in recent CVEs were analyzed, which a focus on those that are applicable to edge computers. FIG. 10 is a plot that illustrates the incidences of these CVEs over time for the past 22 years. It was found that the three most common CVE classes over time were malicious code execution, overflows, and memory corruption. The proof-of-concept computer system's architecture was inherently designed to detect and defeat malicious code execution (i.e., malware), so the most obvious attack was to inject malware into the system. Since the $2^{nd}$ most common CVEs were overflows, it was decided that injecting malware into the proof-of-concept computer system using a traditional buffer overflow attack would be the most meaningful penetration test. The UART that was implemented to switch between image processing modes was selected as the buffer overflow attack vector. While it is unlikely that a SOCOM edge computer would have a physical UART connection, many wireless peripherals attach to edge computer serial peripherals such as UARTs as their point-of-contact to the computer. This means that a wired buffer overflow attack would be representative of what a SOCOM edge computer would experience in the field from the CPU hardware's perspective. It was decided that memory corruption could be handled using a memory comparison algorithm running in the background.

Figure 11:
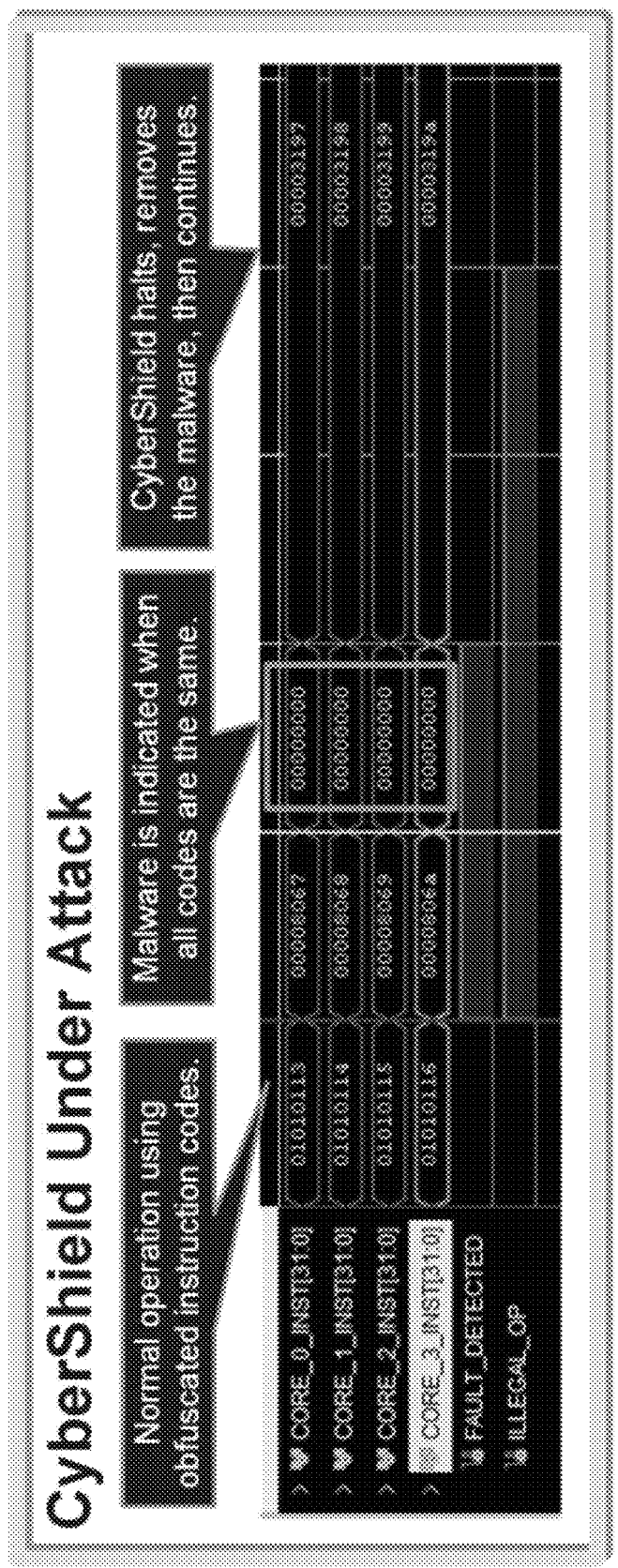
FIG. 11 is a screenshot of a logic analyzer measurement showing test data of a proof-of-concept computer system operating under an attack according to various embodiments of the present disclosure.

A malware injection attack was designed that would inject a large amount of binary data over the UART. The binary data held numerous copies of a vector return address so that when the UART interrupt service routine (ISR) ended, it would retrieve an incorrect return address. The incorrect return caused the CPU to begin executing malicious code that resided in the lower portion of data memory (i.e., the stack location) as opposed to returning to the normal program in instruction memory. In order to observe the attack, an internal logic analyzer was inserted into the FPGA and the instruction codes of each of the CPUs within proof-of-concept computer system were monitored. The logic analyzer measurement is shown in FIG. 11. This waveform shows actual test data of the proof-of-concept computer system operating under an attack. It can be seen that the system is executing obfuscated instruction codes during normal operation. It then shows that an attack is underway when the instruction codes all match. The recovery algorithm implemented in the proof-of-concept computer system was to halt the CPUs, restore their program memories using golden copies, and begin program execution from the beginning.

A malware-resistant edge computer device 100 in accordance with various embodiments may be used, for example, in military, aerospace, and critical infrastructure application. In some embodiments, the computer device 100 may include a single-board computer (SBC) that abstracts the hardware obfuscation from the developer. The small form factor of the SBV may enable use in body-worn and arial systems. In some embodiments, a redundant processor having hardware obfuscation to detect and defeat malware attacks may be provided as an Intellectual Property (IP) core that can be instantiated in a user's own FPGA design. This may enable the embodiment technology to be sold as software for users developing large systems that have custom FPGA designs in it. This may be suitable for larger communication systems and mobile command centers, for example Various embodiments of a computer device 100 as described above may also be utilized for aerospace applications. Exemplary fault-tolerant computer systems for space and other extreme radiation environments are described in the above-mentioned U.S. patent application Ser. No. 18/484,106, filed on Oct. 10, 2023. Such systems may also include the various techniques for detecting and defeating malware attacks described herein in order to provide enhanced cybersecurity protection in addition to radiation-tolerance. Such a solution may have applications in both commercial and military space industries.

Various embodiments of a computer device 100 as described above may also be utilized for critical infrastructure applications (e.g., power plants, water treatment plants, communication networks, etc.), which frequently utilize edge computers for industrial control applications. The edge computers currently used are typically only protected by network security measures implemented on the network control computer. A computer device 100 according to various embodiments may add a last line of defense for these edge computers by deploying malware detection and denial at the point-of-execution.

Although the foregoing refers to particular embodiments, it will be understood that the disclosure is not so limited. It will occur to those of ordinary skill in the art that various modifications may be made to the disclosed embodiments and that such modifications are intended to be within the scope of the disclosure. Compatibility is presumed among all embodiments that are not alternatives of one another. The word "comprise" or "include" contemplates all embodiments in which the word "consist essentially of" or the word "consists of" replaces the word "comprise" or "include," unless explicitly stated otherwise. Where an embodiment using a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art. All publications, patents and patent applications referred to herein are incorporated by reference in their entirety to the same extent as if each individual publication, patent or patent application was specifically and individually indicated to be incorporated by reference in its entirety.

The invention claimed is:

1. A computer device, comprising:
    a computing engine comprising:
        a plurality of processor cores configured to simultaneously execute identical sets of processor-executable instructions, wherein the each of the processor cores includes different instruction code assignments;
        a malware monitoring and remediation component that detects presence of malware when instruction register values from a predetermined number of processor cores are identical during an instruction cycle; and
        a trusted execution environment (TEE) processor configured to:
            receive program code;
            generate multiple copies of the program code for execution by the plurality of processor cores;
            obfuscate the instruction codes in each copy of the program code;
            load the obfuscated instruction codes into instruction memories of the plurality of processing cores; and
            update instruction decoder tables within each of the plurality of processing cores to enable the processing cores to interpret the obfuscated instruction codes.

2. The computer device of claim 1, wherein the computing engine is implemented using one or more field programmable gate arrays (FPGAs).

3. The computer device of claim 2, wherein each of the processor cores comprises a softcore processor core utilizing an open-source instruction set architecture.

4. The computer device of claim 3, wherein each of the processor cores comprises a RISC-V softcore processor core.

5. The computer device of claim 1, wherein the predetermined number of processor cores comprises all of the redundant processor cores of the computing engine.

6. The computer device of claim 1, wherein the malware monitoring and remediation component is configured to initiate one or more remedial actions in response to detecting the presence of malware.

7. The computer device of claim 6, wherein the one or more remedial actions comprises at least one of removing the malware and restoring new sets of obfuscated instruction binaries, halting the system for manual intervention, and quarantining the malware for cyber-forensics.

8. The computer device of claim 1, wherein the TEE processor is further configured to store an original copy of the program code in a memory to enable restoration of the instruction memories of the plurality of processing cores in the event of a malware penetration or other fault condition.

9. The computer device of claim 1, wherein the program code received by the TEE processor is encrypted, and the TEE processor is further configured to:
    decrypt the encrypted program code; and
    verify that the program code is from a trusted source.

10. The computer device of claim 1, further comprising:
    an electromagnetic (EM) shield component operatively coupled to the computing engine and comprising at least one EM radiation sensor configured to detect EM signals in the vicinity of the computer device.

11. The computer device of claim 10, wherein the EM shield component supports wireless connectivity of the computer device using one or more wireless communication interfaces.

12. The computer device of claim 11, wherein the one or more wireless communication interfaces comprises at least one of a WiFi™ interface, a Bluethooth® interface, a UHF/VHF interface, and a 4G/5G interface.

13. The computer device of claim 1, further comprising:
    a camera operatively coupled to the computing engine; and
    a display operatively coupled to the processing engine, wherein the computing engine is configured to process images captured by the camera and display the processed images in on the display.

14. The computer device of claim 13, wherein the computer device is configured to operate in at least one of:
    a raw image mode in which the computing engine overlays one or more patterns on the displayed images to highlight areas of interest; and
    an edge detection mode.

15. A method of operating a computer system, comprising:
    receiving a first version of machine-readable code;
    replicating and modifying the first version of the machine-readable code to provide multiple functionally-equivalent instances of the machine-readable code having different instruction code assignments;
    storing the first version of the machine-readable code in a memory;
    loading the multiple functionally-equivalent instances of machine-readable code into a plurality of redundant processing cores, wherein portions of the code are obfuscated such that instruction code assignments for each of the redundant processing cores are different;
    executing the code using the redundant processing cores;
    monitoring instruction registers of each of the redundant processing cores while the processing cores execute the code; and detecting the presence of malware when the instruction registers for multiple processing cores have the same value.

16. The method of claim 15, further comprising:

accessing the stored first version of the machine-readable code in response to detecting the presence of malware;

replicating and modifying the first version of the machine-readable code to provide additional functionally-equivalent instances of the machine-readable code having different instruction code assignments for each of the redundant processing cores; and loading the additional functionally-equivalent instances of the machine-readable code into the plurality of redundant processing cores.

17. The method of claim 16, wherein the instruction code assignments for each of the additional functionally-equivalent instances of the machine-readable code loaded into the plurality of redundant processing cores are different from the instruction code assignments for the functionally-equivalent instances of the machine-readable code that were previously executed by the respective processing cores.

18. The method of claim 15, wherein the portions of the code are obfuscated using a random number generator-based algorithm to generate instruction codes for each instance of the machine-readable code, and the method further comprises:

updating instruction decoder tables within each of the redundant processing cores with the instruction code assignments for the respective processing cores.

19. The method of claim 15, wherein the first version of machine-readable code is received from a central server in an encrypted format, and the method further comprises performing a decryption process on the machine-readable code prior to replicating and modifying the first version of the machine-readable code.

20. The method of claim 15, further comprising:

performing a verification process using a keying system to confirm that the first version of machine-readable code is received from a trusted source.

\* \* \* \* \*